United States Patent Office 3,060,246
Patented Oct. 23, 1962

3,060,246
HEXAETHYLIDENE-CYCLOHEXANE
Heinrich Hopff, Kusnacht, Zurich, and Arnold Wick, Basel, Switzerland, assignors to J. R. Geigy A.-G., Basel, Switzerland
No Drawing. Filed Jan. 12, 1962, Ser. No. 165,935
Claims priority, application Switzerland Jan. 13, 1961
2 Claims. (Cl. 260—666)

The present invention relates to a novel compound and to a method for preparing same.

It has now been found that there is a simple method of preparation of the hitherto unknown hexaethylidene-cyclohexane of the formula

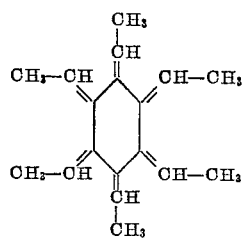

namely to treat hexa-α-halogen ethyl benzene with dehalogenating and reducing agents. Such agents are principally alkaline metals or alkaline earth metals in the presence of alcohols or also tertiary nitrogenous bases in the presence of suitable reducing agents such as hydrazine. The desired dehalogenation ensues at higher temperatures, e.g. at the boiling point of the alcohol used.

The hexaethylidene-cyclohexane is first produced as a viscous yellow oil which can be purified by high vacuum distillation or sublimation. It forms colourless crystals of melting point 133.4–134° C., having a distinct odour of garlic. The addition product with tetranitromethane is orange coloured. In strongly polarising solvents, such as glacial acetic acid containing hydrogen chloride, it is soluble with a reddish violet colour. The new compound, hexaethylidene-cyclohexane, is suitable for tracing free protons in organic solvents because, with such protons, it shows a colour change from colourless to violet. This indication is very sensitive. It may serve as an intermediate product in the preparation of dyestuffs and pharmaceutical products.

*Example*

6 parts of hexa-α-chloroethyl benzene, produced by the chlorination of hexaethyl benzene in carbon tetrachloride while exposing to light at room temperature, are dissolved in 250 parts of anhydrous methanol at the boiling point and then, after the addition of 10 parts of magnesium shavings, the whole is boiled for a further three hours during the course of which the magnesium is completely dissolved and hydrogen is developed. 500 parts of water are then added, the precipitated magnesium hydroxide is dissolved in concentrated hydrochloric acid and the reaction mixture is extracted with benzene. Upon evaporation of the benzene in a vacuum, the extract leaves about 4 parts of a viscous oil which, by vacuum distillation, produces 3 parts of a pale yellow oil from which, if allowed to stand, colourless crystals of hexaethylidene-cyclohexane separate. The product crystallises from acetone in large prismatic crystals which melt at 133.5–134° C.

In place of hexa-α-chloroethyl benzene, the corresponding quantity of hexa-α-bromoethyl benzene may be employed. Dehalogenation can also take place by boiling the halogen compounds with hydrazine hydroxide in a solution of ethyl alcohol. In place of the magnesium, alkaline metals or alkaline earth metals in the presence of alcohols, e.g. sodium in isopropanol or calcium in methanol, may be used.

What is claimed is:

1. Hexaethylidene-cyclohexane of the formula

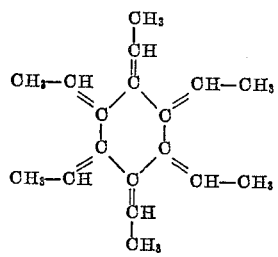

2. The method for the production of hexaethylidene-cyclohexane which comprises treating hexa-α-halogen-alkylbenzenes with dehalogenating and reducing agents.

No references cited.